UNITED STATES PATENT OFFICE 2,112,802

RUBBER COMPOUNDS AND PROCESS OF MAKING SAME

Johannes Behre, Hamburg-Klein-Borstel, Germany, assignor to Lehmann & Voss & Company, Hamburg, Germany No Drawing. Application May 13, 1936, Serial No. 79,607. In Germany May 17, 1935

6 Claims. (Cl. 134—17)

This invention relates to improvements in rubber compounds and process of making same.

It is known that solvent naphtha (benzin), trichloräthylen, higher alcohols, etc. may serve as swelling liquids for latex, for concentrates of latex and for products made from coagulated latex. It is further known, that phosphatides may serve as aids in the process of making rubber compounds and for facilitating the incorporation of fillers into plastics. The addition of phosphatides accelerates the vulcanization and effects a better dispersion of the fillers in rubber and thus permits to reduce considerably the amount of other so called softeners such as stearic acid, woolgrease and the like.

As a swelling agent for latex, concentrates of latex and products made from coagulated latex, phosphatides cannot be used. It is known from the literature and from experiments of the petitioner, that no swelling effect takes place. On the contrary an addition of phosphatides has no effect on the viscosity of latex and concentrates of latex and does not swell the rubber if added to coagulated rubber but makes it crumbly as crumbs of bread.

My experiments showed the surprising result that phosphatides, when added to one of the known swelling liquids, such as solvent naphtha (benzin), trichloräthylen, higher alcohols, essential oils, fatty oils, mineral oils and others, do not reduce the swelling action as one might suppose from the above stated facts but increase considerably their swelling action.

When concentrates of latex are used as adhesives for example in the manufacture of boots, it is necessary to increase the viscosity of the compound in order to lay greater quantities of the adhesive on the surface and to attain in this way a better adhesion. For this purpose, commonly, mineral fillers are used which give a higher viscosity, but at the same time these fillers act as diluting agents and reduce the stickiness. It is known to use solvent naphtha (benzin) in order to increase the viscosity. For example on 1000 cm³ concentrate of latex, 100 cm³ norm. solvent naphtha (benzin) are necessary to increase the viscosity of concentrate of latex of commercial quality to such a degree that the adhesive compound has a sufficient viscosity. My experiments have shown that on 1000 cm³ concentrated latex only 66 cm³ of a solution of 5 parts of phosphatides in 100 parts of solvent naphtha (benzin) are necessary to get equal viscosity, which is attained with 100 cm³ of solvent naphtha (benzin). The improvement is that 34 cm³ solvent naphtha (benzin) may be spared when 3.3 grammes phosphatides are added. Besides this saving of money the advantage of this process is, that the adhesive mass is not so inflammable and not so poisonous.

For the solution of phosphatides one may take instead of solvent naphtha (benzin) also trichloräthylen, higher alcohols, essential oils, fatty oils, mineral oils, and others. My further experiments showed that solutions of phosphatides in the named solvents, the concentration of which may be varied according to the desired effect, exercise a strong swelling action on the products of coagulated latex. The phosphatides dissolved in the said solvents, have an action on the coagulated latex just opposite to their action they have when not dissolved.

This action is of special importance for the manufacture of rubber solutions and so named rubber cements. For example one needs commonly for 1 kg. of masticated crepe, 6 kg. of solvent naphtha (benzin) in order to get a solution for commercial use. One needs only 4.8 kg. of a solution of 5% phosphatide in solvent naphtha (benzin) to get a rubber-solution of equal viscosity. It is impossible to get with solvent naphtha (benzin) a solution of unmasticated rubber, too much particles of the rubber remaining unsolved and the swelling showing very high structure viscosity; it is "very short" as the expert says and impossible to be spread. If one takes instead of solvent naphtha (benzin) a solution of 5% phosphatides in solvent naphtha (benzin), the swelling of the compound takes place rapidly, and one gets a solution without structure viscosity. Besides the reduction of solvent naphtha content of the adhesion compound this process enables to save or to reduce the costs of mastication.

The term "rubber" in the following claims is used generally to include rubber latex.

What I claim is:

1. A process for swelling rubber which comprises, adding phosphatides to a liquid swelling agent for rubber in sufficient quantity to increase the swelling action of the swelling agent, and combining the resultant mixture with the rubber.

2. A process for making a rubber cement from masticated crepe rubber which comprises, adding phosphatides to a liquid swelling agent for rubber in sufficient quantity to increase the swelling action of the swelling agent and combining the resultant mixture with the masticated crepe rubber to form a solution.

3. A process for making a rubber cement from unmasticated rubber which comprises, adding phosphatides to a liquid swelling agent for rubber in sufficient quantity to increase the swelling action of the swelling agent and combining the resultant mixture with the unmasticated rubber to form a solution.

4. A process for swelling rubber latex which comprises, adding phosphatides to a liquid swelling agent for rubber latex in sufficient quantity to appreciably increase the swelling action of the swelling agent, and combining the resultant mixture with the rubber latex.

5. The product manufactured by the process of claim 1.

6. The product manufactured by the process of claim 4.

JOHANNES BEHRE.